United States Patent
Meadows et al.

(10) Patent No.: US 7,997,083 B2
(45) Date of Patent: Aug. 16, 2011

(54) METHOD AND SYSTEM FOR DETECTION OF GAS TURBINE COMBUSTION BLOWOUTS UTILIZING FUEL NORMALIZED POWER RESPONSE

(75) Inventors: Christopher T. Meadows, Simpsonville, SC (US); Douglas E. Dean, Greer, SC (US); Jason D. Fuller, Simpsonville, SC (US); William F. Seely, Taylors, SC (US)

(73) Assignee: General Electric Company, Schenectady, NY (US)

( * ) Notice: Subject to any disclaimer, the term of this patent is extended or adjusted under 35 U.S.C. 154(b) by 1022 days.

(21) Appl. No.: 11/845,979

(22) Filed: Aug. 28, 2007

(65) Prior Publication Data
US 2009/0063003 A1    Mar. 5, 2009

(51) Int. Cl.
*F02C 7/00*    (2006.01)
(52) U.S. Cl. ....................... 60/773; 60/39.281
(58) Field of Classification Search ............ 60/39.281, 60/773, 734, 776, 39.091, 39.53, 737; 73/112.01, 73/112.04
See application file for complete search history.

(56) References Cited

U.S. PATENT DOCUMENTS

| | | | | |
|---|---|---|---|---|
| 2,999,353 | A * | 9/1961 | Petry et al. | 60/238 |
| 7,100,357 | B2 | 9/2006 | Morgan et al. | |
| 2005/0278108 | A1 | 12/2005 | Norman et al. | |
| 2006/0042261 | A1 | 3/2006 | Taware et al. | |

FOREIGN PATENT DOCUMENTS

EP    1605205 A2    12/2005
* cited by examiner

*Primary Examiner* — Ehud Gartenberg
*Assistant Examiner* — Vikansha Dwivedi
(74) *Attorney, Agent, or Firm* — Ernest G. Cusick; Frank A. Landgraff

(57) ABSTRACT

A method and controller for identifying lean blowout conditions in a Dry Low $NO_x$ (DLN) combustor during a premix mode. An effective approach to quickly and reliably identify a blowout during operation in the premix mode is by the effect on fuel normalized power (FNP). FNP is a useful signal, in that a power reduction from a blowout may be distinguished much slower changes in power resulting from global fuel demand (changing load request). A difference between the FNP and a filtered FNP parameter may be compared against a predetermined threshold. If the difference exceeds the threshold, a lean blowout is identified and a signal may be transmitted to the turbine controller to reposition combustor operation away from blowout conditions.

9 Claims, 5 Drawing Sheets

US 7,997,083 B2

METHOD AND SYSTEM FOR DETECTION OF GAS TURBINE COMBUSTION BLOWOUTS UTILIZING FUEL NORMALIZED POWER RESPONSE

RELATED APPLICATIONS

The present invention is related to the following application by the General Electric Company, Ser. No. 11/839,708, filed on Aug. 16, 2007, Method of Mitigating Undesired Gas Turbine Transient Response Using Event-Based Actions.

BACKGROUND OF THE INVENTION

The present invention relates generally to gas turbine control. More particularly, the invention relates to a method and system for providing advance warning or avoidance of lean blowouts for the combustion system of a gas turbine, especially directed to a Dry Low $NO_x$ (DLN) combustor.

Industrial and power generation gas turbines have control systems with controllers that monitor and control their operation. These controllers govern the combustion system of the gas turbine. To minimize emissions of nitric-oxides (NOx), DLN combustion systems have been developed and are in use. Control scheduling algorithms are executed by the controller to operate DLN combustion systems. Conventional DLN algorithms receive as inputs measurements of the exhaust temperature of the turbine and of the actual operating compressor pressure ratio. DLN combustion systems typically rely solely on the turbine exhaust temperature and compressor pressure ratio to determine an operating condition, e.g., turbine exhaust temperature, of the gas turbine.

FIG. 1 depicts a gas turbine 10 having a compressor 12, a combustor 14, and a turbine 16 coupled to the compressor and a control system or controller 18. An inlet 20 to the compressor feeds ambient air and possibly injected water to the compressor. Air flows through the inlet 20 into the inlet guide vanes 21 of the compressor. An exhaust duct 22 for the turbine directs combustion gases from the outlet of the turbine through ducts having, for example, emission control and sound absorbing devices. The turbine may drive a generator 24 that produces electrical power and supplies the electric power through a breaker 25 to an electrical grid 27.

The operation of the gas turbine may be monitored by several sensors 26 detecting various conditions of the turbine, generator and environment. For example, temperature sensors may monitor ambient temperature surrounding the gas turbine, compressor discharge temperature, turbine exhaust gas temperature, and other temperature measurements of the gas stream through the gas turbine. Pressure sensors may monitor ambient pressure, and static and dynamic pressure levels at the compressor inlet and outlet, and turbine exhaust, as well as at other locations in the gas stream. Further, humidity sensors, e.g. wet and dry bulb thermometers, measure ambient humidity in the inlet duct of the compressor. The sensors 26 may also comprise flow sensors, speed sensors, flame detector sensors, valve position sensors, guide vane angle sensors, or the like that sense various parameters pertinent to the operation of gas turbine 10. As used herein, "parameters" and similar terms refer to items that can be used to define the operating conditions of turbine, such as temperatures, pressures, and flows at defined locations in the turbine that can be used to represent a given turbine operating condition.

A fuel control system 28 regulates the fuel flowing from a fuel supply to the combustor 14, the split between the fuel flowing into various nozzles and the fuel mixed with air before flowing into the combustion zone, and may select the type of fuel for the combustor. The fuel control system may be a separate unit or may be a component of a larger controller 18.

The controller may be a General Electric SPEED-TRONIC™ Gas Turbine Control System. The controller 18 may be a computer system having a processor(s) that executes programs to control the operation of the gas turbine using sensor inputs and instructions from human operators. The programs executed by the controller 18 may include scheduling algorithms for regulating fuel flow to the combustor 14. The commands generated by the controller cause actuators on the gas turbine to, for example, adjust valves between the fuel supply and combustors that regulate the flow and type of fuel, inlet guide vanes 21 on the compressor, and other control settings on the gas turbine.

The controller 18 regulates the gas turbine based, in part, on algorithms stored in computer memory of the controller. Fuel and air are combined in a combustion process in gas turbine engines. To control the production of oxides of nitrogen (NOx) in this process, combustion flame temperature and fuel mixing must be tightly maintained. Fuel and air can be premixed uniformly to avoid localized areas of high combustion temperature and the engine can be operated below certain temperatures to avoid production of unacceptable amounts of NOx. These algorithms enable the controller 18 to maintain the $NO_x$ and carbon monoxide (CO) emissions in the turbine exhaust to within certain predefined limits, and to maintain the combustor firing temperature to within predefined temperature limits. The algorithms include parameters for current compressor pressure ratio, compressor discharge temperature, ambient specific humidity, inlet pressure loss and turbine exhaust back pressure.

Typically, significant margin exists on combustion systems in that transient under-fire events have no significant negative impact. However on advanced ultra low emissions combustion systems, the margins are much tighter. Transient under-fire can result in combustion dynamics or a loss of flame. Combustion dynamics within the combustor are known to damage hardware. Loss of flame in a combustion can creates high exhaust temperature spreads. The plugs are fired returning the machine to Lean Lean, a high emissions mode of operation. A unit trip can also occur on high spreads.

Gas turbines with dry low NOx combustion systems operate at very lean fuel/air (F/A) ratios closer to a Lean Blowout (LBO) boundary in order to maintain low NOx emissions. F/A ratios leaner than the LBO boundary value can result in blowout of the flame. Further, can-to-can F/A ratio variability results in cans having F/A ratios closer to the LBO boundary that are more prone to blowout than cans that are operating at a larger margin from the LBO boundary. A blowout in one can sometimes leads to blowout in several adjacent cans, which can eventually trigger a turbine trip. Turbine trips due to LBO can be costly. Revenue can be lost during downtime due to trips and physical damage can be inflicted on the combustion components due to the blowout.

Lean blowout or weak extinction is the point at which the mixture of fuel and air is no longer flammable. For premixed multi-nozzle systems, weak extinction can be defined as the point at which there is a significant drop in the combustion efficiency and or complete extinction of the flame.

Prior art apparatus and methods by Norman et al. (U.S. Publication 2005/0278108) for predicting lean blowouts include extracting a plurality of tones in pressure signals representative of pressure within monitored combustion cans, tracking a frequency of a hot tone in each monitored cans, and utilizing extracted tones and the tracked frequency to determine a probability of an LBO. Taware et al. (U.S. Publication 2006/0042261) incorporates use of pressure signals and/or flame detector signals to determine the presence of an LBO precursor and the probability of an LBO, and to initiate a gas turbine response to avoid an LBO event. However, these systems require special transducers and instrumentation and may be more appropriate for testing and inspection purposes than for continuous online operation.

When a lean blowout occurs, either high spreads or the reduction in combustion reference temperature will fire the spark plugs in order to relight the unlit cans. The unit will revert to Lean Lean or Extended Lean Lean which is a higher emissions mode of operation. In order to return to the lower emissions mode, which utilizes premixed fuel and air, the unit must be unloaded significantly to clear a software latch resetting premixed mode. If the original issue that caused the blowout has not been connected by adjusting controls algorithms, the unit may be unable to transfer back into the premixed fuel mode and stay there. This can result in a forced shutdown as customers are often forbidden to operate in high emissions modes for any length of time by government regulations.

Loss of flame in a combustion can creates high temperature spreads, but because of the lag inherent to temperature measurement, the spark plugs can be triggered before the temperature spread can be used to identify the blowout. The need is to identify the blowout as an unintentional transition and not the result of normal power transitions.

Accordingly, new control algorithms are required to identify LBO events and transiently position the gas turbine unit to prevent combustion dynamics or loss of flame in subsequent operation while conforming to strict emission requirements.

BRIEF DESCRIPTION OF THE INVENTION

According to one aspect of the present invention, a method is provided for detecting a lean blowout in one or more combustion cans of a gas turbine engine. The method includes detecting a shift in generated power output that does not result from a changing fuel demand, determining that the shift in generated power output results from a lean blowout in a combustor, transmitting a signal to a turbine controller to initiate action to increase margin to lean blowout in all combustors, and implementing a response increasing margin to lean blowout for all combustors.

According to another aspect of the present invention, a controller is provided for a gas turbine having a compressor, a combustor, a turbine, and a generator with an output breaker. The controller may include sensor inputs receiving data for a plurality of gas turbine operational parameters related to sensing a shift in generated power that does not result from changing fuel demand; an algorithm for detecting a shift in generated power output that does not result from changing fuel demand; and an output signal initiating a change in the gain of an emissions control model.

In accordance with a further aspect of the present invention, a gas turbine is provided. The gas turbine may include a turbine; a combustor; a generator; a generator output breaker; an electrical grid; sensors for monitoring a plurality of gas turbine operational parameters related to sensing a shift in generated power that does not result from changing fuel demand; and a controller. The controller provides sensor inputs for power produced at the output of a generator, a total fuel reference, and generator output breaker closed status; and a threshold algorithm for detecting a lean blowout in a combustor during premix mode. The threshold algorithm incorporates a calculation for fuel normalized power (FNP) according to the equation:

$$FNP = \frac{Power}{Fuelref - Fuelref_{FSNL}} \quad \text{Equation 1}$$

where Power is represented in Driven Megawatts at the output of the generator; Fuelref represents Total Fuel Reference demand supplied to the machine; and $Fuelref_{FSNL}$ represents Fuel Reference required at Full Speed No Load. The controller also provides a programmed response to the detection of the lean blowout in a combustor during premix operation including an output signal initiating a change in the gain of an emissions control model.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including identifying combustion dynamics and flameout by identifying designated transient conditions and allowing continued operation at targeted $NO_x$ levels.

An effective approach to quickly and reliably identifying a blowout during operation in the premix mode is by the effect on produced turbine power. To this end, Fuel Normalized Power (FNP) is a very useful signal, in that a power reduction caused by a blowout may be distinguished from much slower changes in power driven by global fuel demand (changing load request). FNP also has a much faster response than alternative signals, such as temperature. Monitoring changes in FNP can permit detecting, with confidence, the lean blowout.

The first step in detection of blowout in at least one combustor is to differentiate it from transients that result in changes in power from controlled fuel. Fuel Normalized Power (FNP) is power normalized to the current fuel reference, less the amount to hold speed at no power, as calculated below in Equation 1 as previously described:

$$FNP = \frac{Power}{Fuelref - Fuelref_{FSNL}} \quad \text{(Equation 1)}$$

where Power is represented in Driven Megawatts at the output of the generator; Fuelref represents Total Fuel Reference demand supplied to the machine; and $Fuelref_{FSNL}$ represents a Fuel Reference required at Full Speed No Load.

Figure 1:
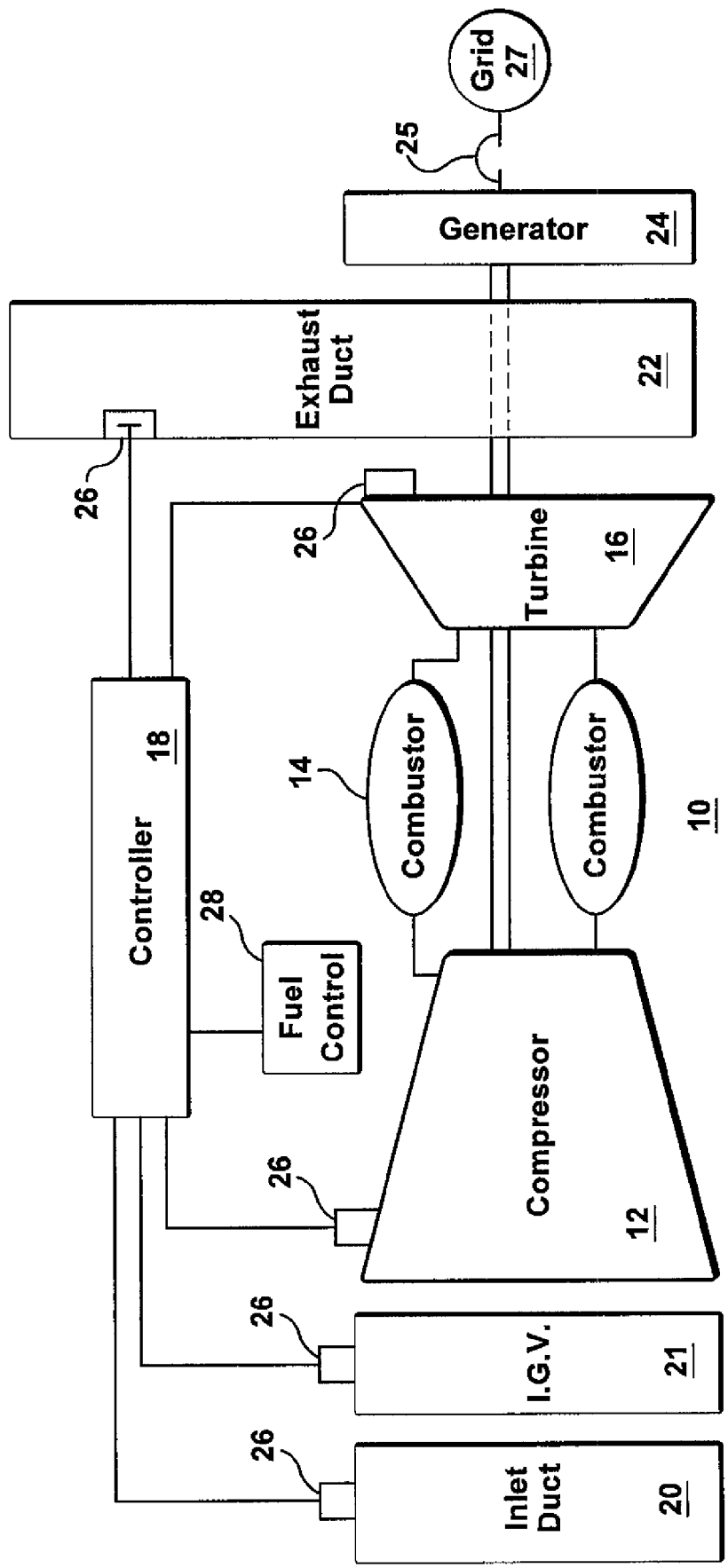
FIG. 1 illustrates a gas turbine having a fuel control system.
Figure 2:
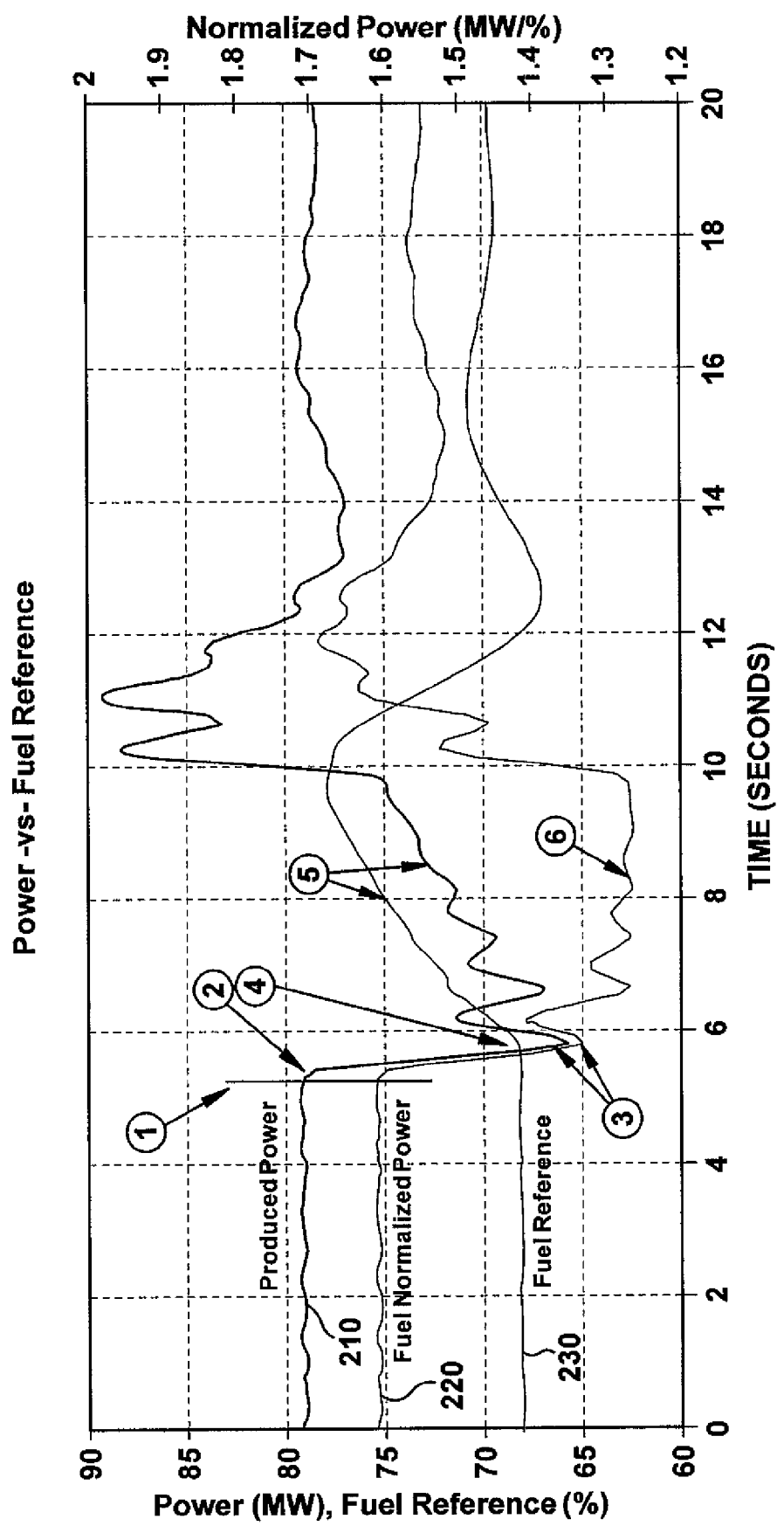
FIG. 2 illustrates the relative response of produced power, fuel normalized power and fuel reference signals during a can flameout.

FIG. 2 illustrates an example of a response to a flameout in one can. Produced power 210 (Mw), fuel normalized power 220 (Mw/%) and fuel reference 230 (%) are tracked during the can flameout starting from approximately an initial 79 MW of produced power. The flameout occurs at 1. Produced power 210 and fuel normalized power 220 drop rapidly at 2 in response to the reduced power output at 3 from operation of the remaining cans. The drop in produced power 210 will cause the fuel reference 230 to begin increasing fuel supplied to the operating cans to restore produced power towards the original value. At 5, produced power 210 will roughly track fuel reference 230 due to the increased fuel being supplied. Fuel normalized power 220, however, will remain relatively flat at 6, being normalized by the fuel reference factor in the denominator. Here above, the fuel normalized power parameter is shown to be able to respond rapidly to changes in produced power and be differentiated from slower moving transient response from changes in fuel reference.

To discern a blowout condition from normal load transients, a first order lag filter may be implemented on the output of the fuel normalized power calculation. The filter time constant may be set based on simulation and actual running unit field data, to filter out the blowout transient while having minimal effect on normal unloading events. Therefore, when the difference between the unfiltered fuel normalized power and the filtered fuel normalized power is calculated, the result may be used as an indication of lean blowout when it exceeds a predetermined threshold. A lag filter time constant of approximately 5.0 seconds may be preferred.

Figure 3:
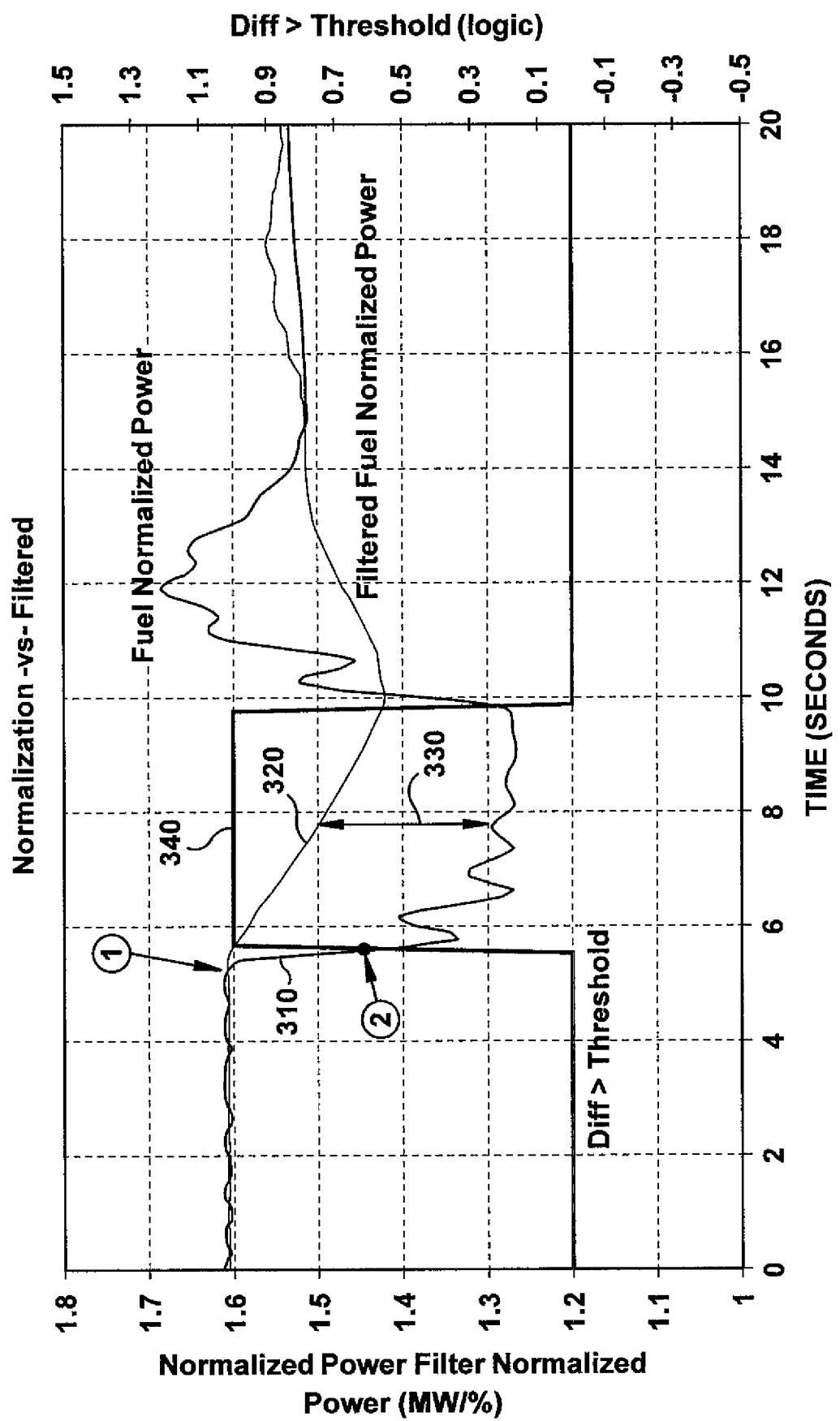
FIG. 3 illustrates a relative response of fuel normalized power and filtered fuel normalized power during a lean blowout transient.

FIG. 3 illustrates a relative response of fuel normalized power and filtered fuel normalized power during a lean blowout transient. In response to a lean blowout at 1, fuel normalized power 310 (MW/%) drops rapidly from an initial value of about 1.6. Filtered fuel normalized power 320 (MW/%) responds more slowly, establishing a difference 330. The difference 330 triggers a logical signal true 340 at 2 when the difference exceeds a predetermined threshold value. The exemplary threshold value for the transient in FIG. 3 is set to approximately 0.15 (MW/%).

To be effective as a threshold for identifying lean blowout in cans when the generator breaker, is closed, the threshold value must be high enough to discriminate so other non-lean blowout transients do not result in providing false triggering of the lean blowout response. The difference between the FNP response and the filtered FNP response was captured during site testing for frequently performed operations such as water wash on transient, water wash off transient, premix transfer and during power unload. The threshold value of approximately 0.15 was not reached during the transients tested, providing a high degree of confidence that a lean blowout determination and response would not be unintentionally actuated during non-lean blowout events.

Figure 4:
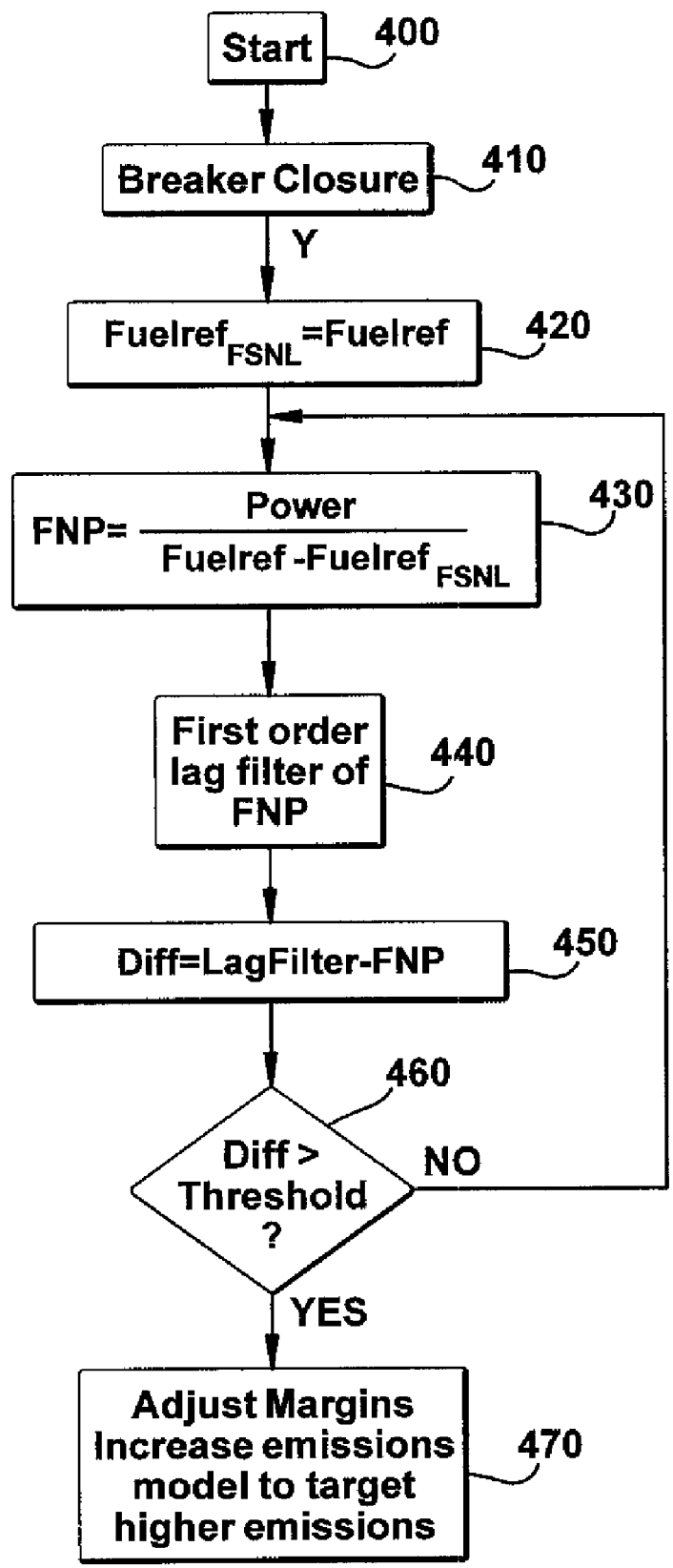
FIG. 4 illustrates an embodiment of an inventive algorithm for sensing a lean blowout and responding by moving to improve margins to subsequent blowout.

FIG. 4 illustrates an embodiment of an inventive algorithm for sensing a lean blowout and responding by moving to improve margins to subsequent blowout. At 400, the algorithm starts. A test is made at step 410 to determine if the generator breaker is closed. If the generator breaker is closed, then in step 420 the fuel reference at full-speed no-load ($Fuelref_{FSNL}$) is set to the current value of Fuelref. FNP is calculated in step 430 according to Equation 1, as described previously. The calculated value for FNP is applied to a first order lag filter in step 440. A Difference is calculated between the FNP filtered and FNP unfiltered value in step 450. In step 460, the Difference is compared against a predetermined threshold value. If the Difference exceeds the predetermined threshold, then margins to lean blowout are adjusted by increasing an emissions model gain in step 470. If the Difference does not exceed the threshold value, then the FNP calculation of step 430 is repeated.

The output of the threshold algorithm may be used to increase the lean blowout margins for subsequent operation. The threshold trigger may be locked in for a predetermined time period to prevent multiple lean blowout signals from occurring.

Application Ser. No. 11/839,708, Method of Mitigating Undesired Gas Turbine Transient Response Using Event-Based Actions, filed by General Electric Company on Aug. 16, 2007 disclosed a method of managing transient events regularly seen during gas turbine operation that may cause undesirable operation and possible hardware damage. During certain transient operations a lag may be seen between reference exhaust temperature and actual turbine exhaust temperature. This lag can result in an under-fired condition within the combustion system of variable magnitude and duration. Either fuel split schedules or a control algorithm can be positioned during these transients to prevent combustion dynamics or loss of flame. Combustion dynamics are known to cause damage that may require immediate hardware replacement. Once the transient has completed normal control operation is resumed.

For transients requiring a long-term or sustained response, the control changes may be implemented through closed loop emission controls and corrected parameter controls (CPC) that determine the turbine exhaust reference temperature being sent to the overall turbine operating controls. In response to a higher turbine exhaust reference temperature signal, the turbine controls may affect a change in the amount of fuel and/or fuel split being sent to the combustor, thereby providing increased margin to combustion dynamics and flameout during the long-term transient or long-term operating condition.

U.S. Pat. No. 7,100,357 by Morgan et al. described a system for controlling gas turbine by adjusting a target reference exhaust temperature that included a number of environmental factors incorporated in algorithms for calculating a reference temperature for turbine exhaust. The algorithms establish a limiting turbine exhaust temperature based on a $NO_x$ emission limiting algorithm, a CO emission limiting algorithm, a target turbine firing temperature algorithm, and a target turbine firing temperature limiting algorithm. The process may be used to maintain turbine emissions and firing temperature at or below target level, especially as ambient conditions and turbine operating parameter vary. The controller adjusts the fuel control to achieve the target turbine exhaust temperature. This algorithm is known as corrected parameter control (CPC).

During operation, the system controller is designed to limit emissions and particularly NOx emissions to a maximum level based on a running average. Limited transient increases in emissions can be acceptable, provided the averaged PPM output is not exceeded. Without CPC and Closed Loop Emissions Control controls, long-term operation at the target emission levels would not be possible during certain extended transient events and operating conditions.

When a transient requiring a long-term response is identified by the controller, the CPC algorithm is "bumped" up so that the unit will transiently run at higher emissions levels increasing the margin to combustion dynamics and flameout potential. Closed Loop Emissions Control then re-tunes the unit to desired emissions levels after steady state operation has been established using emissions feedback data to adjust the controller algorithm.

Figure 5:
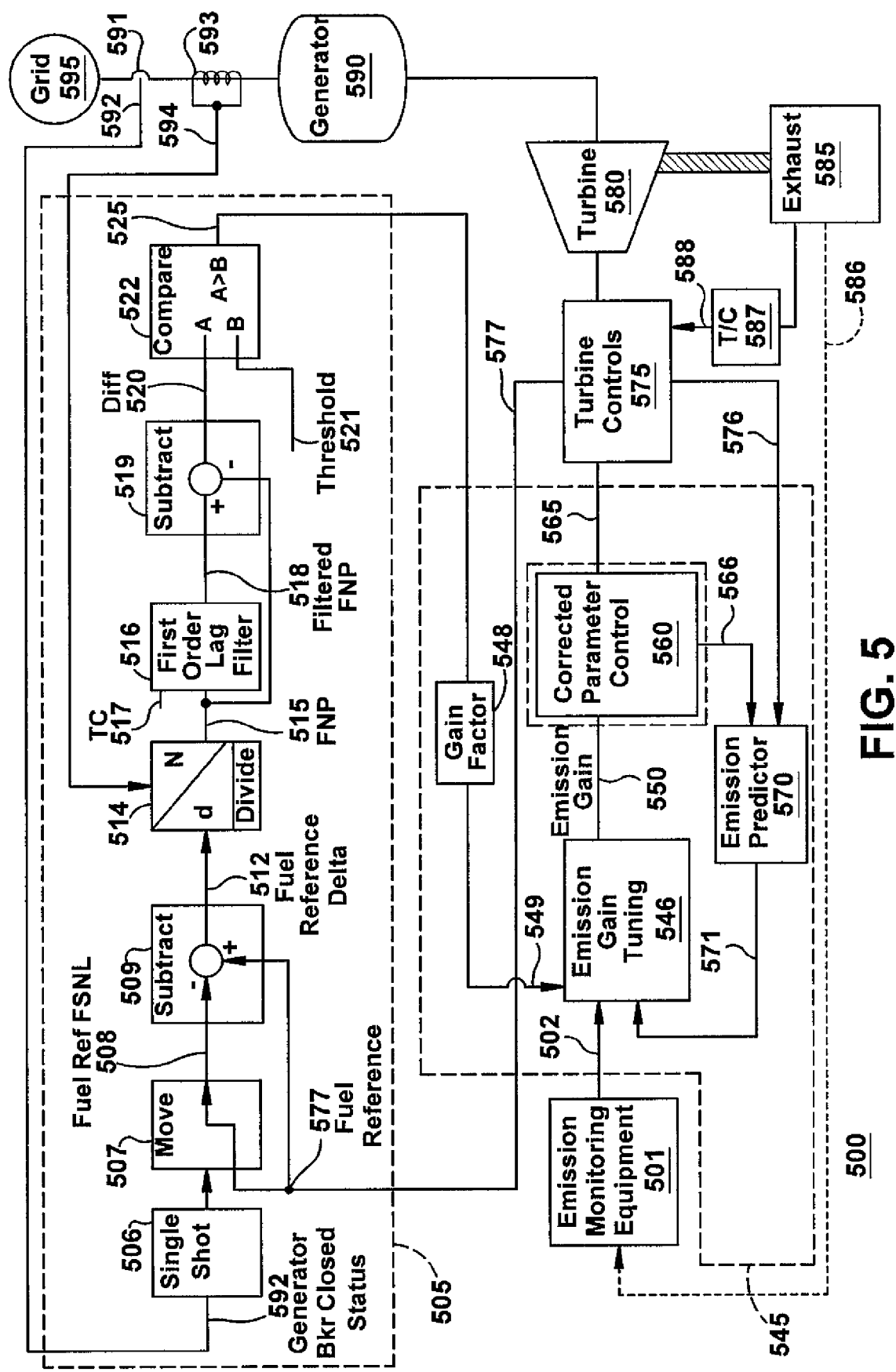
FIG. 5 illustrates a block diagram for the response of the inventive controller to a lean blowout in the premix mode.

FIG. 5 provides a block diagram for describing response of the system to a combustion blowout. FIG. 5 includes a controller 500 incorporating a threshold algorithm block 505, a closed loop emission control block 545 and a corrected parameter control (CPC) block 560 that together establish a reference exhaust temperature 565 for the turbine controls 575. The turbine controls 575 provide the direct control to the gas turbine 580. Turbine exhaust 585 from the gas turbine 580 is monitored for parameters that include temperature 588 from turbine exhaust thermocouple 587 and turbine emissions 586. The turbine exhaust thermocouple temperature 588 is fed back to the turbine controls 575 and the turbine emissions 586 are sensed by the emissions monitoring equipment 501 of the Closed Loop Emissions Control 545. The turbine drives electrical generator 590. Generator output breaker 591 ties the generator 590 to electrical grid 595. Driven megawatt output from the generator 590 is measured by instrumentation represented as 593. Generator output breaker closed status 592 and driven megawatt output 594 are fed back to the logical steps of threshold algorithm 505.

Fuel normalized power, as previously described, is calculated as:

$$FNP = \frac{Power}{Fuelref - Fuelref_{FSNL}}.$$

Within threshold algorithm 505, the generator output breaker closed status 592 triggers a single shot 506 to capture the value of the Fuelref parameter 577 in move block 507, establishing the value for Fuelref$_{FSNL}$ 508. Subtract block 509 establishes the denominator (fuel reference delta 512) for the fuel normalized power calculation (Fuelref−Fuelref$_{FSNL}$).

Driven output megawatts 594 from the generator 590 is divided by the fuel reference delta 512 in divide block 514, yielding the calculated FNP 515. The calculated FNP 515 is applied to a first order lag filter 516 with a preferred time constant 517 of approximately 5 seconds, producing filtered FNP 518. Calculated FNP 515 is subtracted from filtered FNP 518 in subtract block 519. The Difference 520 is compared against threshold value 521 in comparison block 522. When the Difference 520 exceeds the threshold 521, then an FNP difference trigger 525 is activated.

Corrected Parameter Controls 560 utilize various turbine operating parameters to determine a turbine exhaust reference temperature 565 to be provided to the turbine controls 575. Four limiting algorithms, including emissions limiting algorithms (not shown), each provide a limiting temperature output. One of the limiting algorithms output may be selected according to a selection algorithm (not shown) for determining the turbine exhaust reference temperature 565.

During operation, an emissions gain signal 550 is provided by the Closed Loop Emissions Control 545 to the emissions limiting algorithm (not shown) of the CPC 560. The emissions gain signal 550 may be based on the emissions data 586 sensed by emissions monitoring equipment 501 and a predicted emissions signal 571. The predicted emissions signal 571 may be determined by the emissions predictor 570 utilizing the output temperature 566 from the emissions algorithm (not shown) of the CPC 560 and turbine operating conditions parameters 576.

Activating the FNP difference trigger 525 in response to a combustion blowout, may cause a gain factor 548 to temporarily provide an increased gain 549 to the emissions gain tuning model 546. The increased gain input causes the emissions gain signal 550 to the emissions limiting algorithm (not shown) of CPC 560 to increase, thereby raising the limiting temperature output 565 from the CPC 560. The effect of increasing the output from the emissions limiting algorithm (not shown) increases the turbine exhaust reference temperature 565 and/or change fuel splits, thereby increasing the margin to combustion blowout and combustion dynamics.

Differential feedback from the closed loop emissions monitoring equipment 501 and the predicted emissions signal 571 will tend to restore (tune) the emissions gain 550 provided to the CPC 560 to a more normal value. This feedback tends to restore the emissions levels to within allowable operational limits. However, to the extent that the transient event changes the operating conditions of the turbine (for example moving combustion can conditions further from lean blowout) the emissions gain 550 may not be fully restored to the original value.

While this embodiment employs CPC for setting of the reference exhaust temperature, utilization of other control mechanisms for turbine exhaust reference temperature that may respond to signals representing long-term transient events may be considered within the scope of the present invention.

While various embodiments are described herein, it will be appreciated from the specification that various combinations of elements, variations or improvements therein may be made, and are within the scope of the invention.

The invention claimed is:

1. A method for detecting a lean blowout in a combustion can of a gas turbine engine, the method comprising:
    detecting a shift in generated power output that does not result from a changing fuel demand;
    determining that the shift in generated power output results from a lean blowout in a combustor;
    transmitting a signal to a turbine controller to initiate action to increase margin to lean blowout in all combustors; and
    implementing a response increasing margin to lean blowout for all combustors; wherein the step of detecting a shift in generated power output that does not result from a changing fuel demand comprising calculating Fuel Normalized Power (FNP) according to: where Power is represented in Driven Megawatts at the output of the generator; Fuelref represents Total Fuel Reference demand supplied to the machine; and Fuelref$_{FSNL}$ represents Fuel Reference required at Full Speed No Load; and wherein the step of detecting a shift in generated power output that does not result from a changing fuel demand further comprising: tracking the calculated FNP; applying a filter to the calculated FNP to establish a filtered FNP; tracking the filtered FNP; and determining a difference between the filtered FNP and the calculated FNP; and wherein the step of determining that the shift in generated power output results from a lean blowout in a combustor comprising: determining if the difference between the filtered FNP and the calculated FNP exceeds a predetermined threshold.

2. The method for detecting a lean blowout in one combustion can of a gas turbine engine according to claim 1, the step of calculating FNP further comprising:
    monitoring FNP when the turbine generator breaker is closed.

3. The method for detecting a lean blowout in one combustion can of a gas turbine engine according to claim 1, the step of detecting a shift in generated power output that does not result from a changing fuel demand comprising:

setting the $\text{Fuelref}_{FSNL}$ to the value of the Fuelref when the generator load breaker is closed.

4. The method for detecting a lean blowout in one combustion can of a gas turbine engine according to claim 1, the step of applying a filter to the FNP comprising:
applying a lag filter to the FNP.

5. The method for detecting a lean blowout in one combustion can of a gas turbine engine according to claim 4, the step of applying a lag filter to the FNP comprising:
applying a lag filter with a time constant of approximately 5 seconds.

6. The method for detecting a lean blowout in one combustion can of a gas turbine engine according to claim 1, wherein a value for the predetermined threshold is less than a difference between the filtered FNP and the calculated FNP caused by blowout in at least one can during operation in the premixed mode and that is greater than a difference between the filtered FNP and the calculated FNP resulting from routine operational transients.

7. The method for detecting a lean blowout in one combustion can of a gas turbine engine according to claim 6, the step of transmitting a signal to a turbine controller to initiate action to increase margin to lean blowout in all combustors comprising:
transmitting a signal to the turbine controller when the difference between the filtered FNP and the calculated FNP exceeds a predetermined threshold.

8. The method for detecting a lean blowout in one combustion can of a gas turbine engine according to claim 6, the step of transmitting a signal to a turbine controller to initiate action to increase margin to lean blowout in all combustors further comprising:
locking in the signal for a predetermined time period to prevent multiple triggering signals from reaching the turbine controller.

9. The method for detecting a lean blowout in one combustion can of a gas turbine engine according to claim 1, the step of implementing a response increasing margin to lean blowout for all combustors comprising:
implementing a step change in an emissions model algorithm gain.

* * * * *